United States Patent [19]
Tomisawa et al.

[11] Patent Number: 5,586,537
[45] Date of Patent: Dec. 24, 1996

[54] FUEL PROPERTY DETECTING APPARATUS FOR INTERNAL COMBUSTION ENGINES

[75] Inventors: Naoki Tomisawa; Satoru Watanabe, both of Atsugi, Japan

[73] Assignee: Unisia Jecs Corporation, Atsugi, Japan

[21] Appl. No.: 532,822

[22] PCT Filed: Feb. 28, 1995

[86] PCT No.: PCT/JP95/00307

§ 371 Date: Oct. 25, 1995

§ 102(e) Date: Oct. 25, 1995

[87] PCT Pub. No.: WO95/23285

PCT Pub. Date: Aug. 31, 1995

[30] Foreign Application Priority Data

Feb. 28, 1994 [JP] Japan ..................... 6-029312

[51] Int. Cl.$^6$ ..................... F02D 45/00
[52] U.S. Cl. ............ 123/435; 123/686; 73/35.02; 73/116
[58] Field of Search ............ 123/435, 436, 123/575, 1 A, 425, 672–703; 73/35.02, 115, 116, 117.2, 117.3

[56] References Cited

U.S. PATENT DOCUMENTS

| | | | |
|---|---|---|---|
| 4,905,649 | 3/1990 | Washino et al. | 123/435 |
| 4,942,848 | 7/1990 | Terasaka | 123/1 A |
| 5,191,869 | 3/1993 | Kamioka et al. | 123/494 |
| 5,363,314 | 11/1994 | Kobayashi et al. | 364/497 |
| 5,419,296 | 5/1995 | Yamura | 123/435 |
| 5,499,607 | 3/1996 | Tomisawa | 123/435 |

FOREIGN PATENT DOCUMENTS

| | | |
|---|---|---|
| 62-282139 | 12/1987 | Japan . |
| 63-66436 | 3/1988 | Japan . |
| 3-213640 | 9/1991 | Japan . |
| 3-246349 | 11/1991 | Japan . |
| 4-191441 | 7/1992 | Japan . |
| 5-195840 | 8/1993 | Japan . |

*Primary Examiner*—Andrew M. Dolinar
*Attorney, Agent, or Firm*—Foley & Lardner

[57] ABSTRACT

Provided is an apparatus for early detecting a volatility of fuel supplied to an engine after engine start, in order to more precisely provide various increasing corrections during air-fuel-ratio control. During increasing-correction (S4) after engine start, a fuel-injection amount delivered to pre-selected one of cylinders is forcibly changed in a stepped manner (S6). Measured (S10) is an elapsed time T from a time (S7) when the injection-amount is changed in a stepped manner to a time (S9) when the integral Pi of a cylinder internal-pressure reflects its variation based on the stepped change in the injection amount. Since a response to a change in an air-fuel ratio is low in case of a heavy-gravity fuel and high in case of a light-gravity fuel, a fuel volatility such as a heavy gravity or a light gravity can be measured (S11) based on a time interval of said elapsed time T. On the basis of detection results, an increasing-correction amount for during cold engine is corrected (S12) to conform to fuel supplied to the engine.

12 Claims, 6 Drawing Sheets

FUEL PROPERTY DETECTING APPARATUS FOR INTERNAL COMBUSTION ENGINES

TECHNICAL FIELD

The present invention relates to an apparatus and method for detecting a property of fuel supplied to an internal combustion engine, and specifically to an apparatus and method for indirectly detecting a volatility of fuel consumed in the engine to determine as to whether the fuel is a heavy-gravity fuel or a light-gravity fuel.

BACKGROUND ART

In conventional electronically controlled fuel injecting device for internal combustion engines, the amount of fuel supplied to the engine would be increasingly corrected in consideration of deterioration of the fuel volatility during cold-engine operation or in consideration of a transiently increased amount of fuel adhered onto the inner wall surface of the intake passage (the increased flow rate of fuel flowing along the inner wall surface) during accelerating operation.

The requirement for increasing correction of fuel supply is different depending on the degree of the fuel volatility, that is, the degree to which the fuel is heavy or light. In case of heavier gravity fuel of a lower volatility, there is a great requirement for increasing correction of fuel supply. In general, it is difficult to perfectly maintain the degree of the fuel volatility, namely the degree to which the fuel is heavy or light, at a constant value. At least in case of heavy-gravity fuel used for the engine, in the conventional electronically controlled fuel injecting device, a characteristic necessary for the fuel-supply increasing correction suitable for heavy-gravity fuel would be preset, so as to satisfy the requirement for increasing correction of fuel supply.

However, under a condition in which the fuel-supply increasing-correction characteristic suitable for heavy-gravity fuel is held constant, if the characteristic for heavy-gravity fuel is applied to light-gravity fuel in case of which there is almost no necessity of increasing correction of fuel supply, there is a tendency of excessive increasing correction of fuel supply, thereby resulting in an excessively rich air-fuel ratio. As a result, unburned hydrocarbons (HC) contained in the exhaust gases tend to increase. Thus, it is desired that the level of increasing correction of fuel supply is suitably varied depending on the volatility of fuel supplied to the engine. For the reasons set forth above, it is necessary to detect a volatility (heavier-gravity or lighter-gravity) of fuel supplied to the engine.

One such technology, in which the level of increasing correction of fuel supply is corrected to a proper level based on the fuel volatility, has been disclosed in Japanese Patent Provisional Publication (Tokkai Heisei) No. 5-195840.

In the above-mentioned Publication, torque fluctuations in an internal combustion engine, resulting from surge, is monitored and the amount of increasing-correction of fuel is gradually decreased depending on the monitored torque fluctuations (surge torque fluctuations), and thus the increasing-correction amount is controlled so that the surge torque does not exceed an acceptable level. Therefore, the amount of increasing-correction is decreasingly corrected, as the fuel volatility becomes high. As a consequence, the increasing-correction amount of fuel can be provided in a manner so as to conform to the fuel volatility.

However, in case of the prior-art apparatus described in the above-noted Publication, owing to a rapid decrease in the amount of increasing-correction, there is a possibility that the amount of increasing-correction is reduced excessively to such an extent that it exceeds an optimal level for increasing-correction, and thus great surge torque fluctuations, having a bad influence on driveability, occurs. For the reasons set out above, it is difficult to increase a speed of decreasing-correction necessary for the amount of increasing-correction.

Therefore, it takes a long time until an optimal level of the amount of increasing-correction has been reached. The conventional apparatus suffers from the drawback that a period of time for improvement of exhaust-emission control characteristics, based on the optimal amount of increasing-correction, is limited. Thus, it is desired that the correction necessary for adjustment of the increasing-correction amount to its optimal level (in other words, detection of a fuel property) can be achieved for a short period of time.

In the previously-described conventional apparatus, since a fuel-property is detected by varying an air-fuel ratio toward a maximum permissible lean air-fuel mixture, the engine operation will be unstable until the detection of the fuel-property has been finished. Therefore, a judgment for the fuel-property could be made only during idling in which the engine operation is comparatively stable. Furthermore, there is an additional problem that the conventional apparatus tends to be easily affected by disturbance.

It is, therefore, in view of the above disadvantages, an object of the present invention to provide an apparatus which is capable of detecting a property of fuel for a short period of time just after the engine starts, and certainly detecting the fuel property, irrespective of variations in engine operation.

DISCLOSURE OF INVENTION

Figure 1:
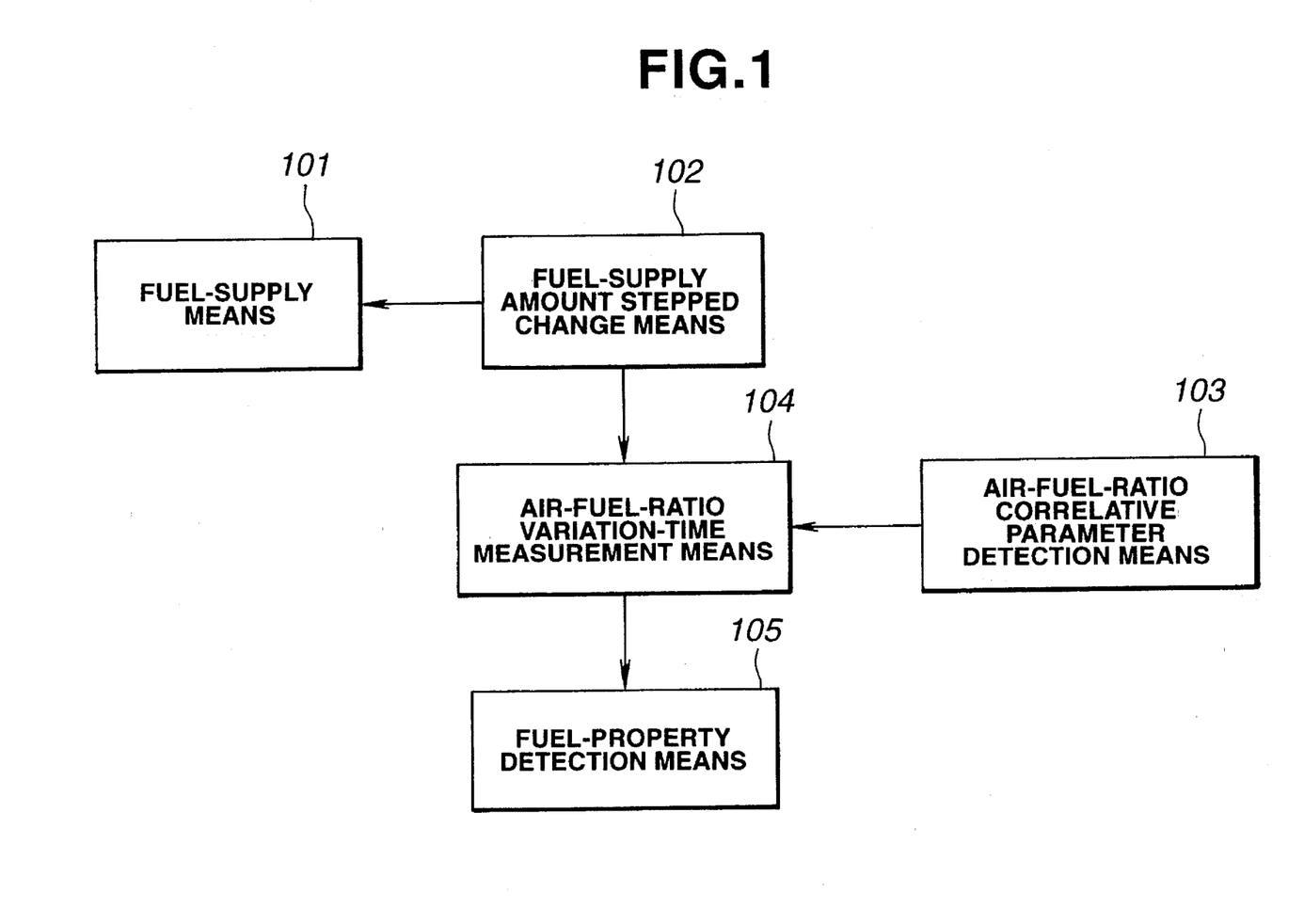
FIG. 1 is a block diagram illustrating a basic construction of the present invention.

The fuel-property detecting apparatus for an internal combustion engine, made according to the invention, is constructed as shown in FIG. 1.

In FIG. 1, a fuel-supply means 101 is provided for supplying fuel into an intake system of the engine. A fuel-supply amount stepped change means 102 is provided for forcibly changing a fuel-supply amount from the fuel-supply means 102 in a stepped manner, for the purpose of detection of the fuel property. An air-fuel-ratio correlative parameter detection means 103 is provided for detecting an engine-operation indicative parameter correlated to an air-fuel ratio of an air-fuel mixture actually introduced into the engine cylinder.

An air-fuel-ratio variation-time measurement means 104 is provided for measuring a period of time from a time when the fuel-supply amount has been varied in a stepped manner by the fuel-supply amount stepped change means 102 to a time when a variation in an air-fuel ratio of the air-fuel mixture introduced into the engine cylinder, correlated to the stepped change in the fuel-supply amount, is detected by the air-fuel-ratio correlative parameter detection means 103.

Also, a fuel-property detection means 105 is provided for setting a fuel-property indicative parameter, on the basis of a time measured by the air-fuel-ratio variation-time measurement means 104.

According to the fuel-property detecting apparatus of the present invention, detected as data indicative of the fuel property is a time period (lag time) for which the air-fuel ratio of air-fuel mixture introduced into the cylinder exhibits a variation corresponding to a stepped change in the fuel-supply amount to the air-intake system of the engine.

As is generally known, when fuel is supplied to the air-intake system of the engine, all of fuel cannot be introduced into the cylinder. That is, some of fuel could be adhered to the inner wall surface of the air-intake passageway or to the intake valves, depending on a volatility of fuel. For example, in case of heavy-gravity fuel of a low volatility, a ratio (adhesion ratio) of the amount of fuel adhered to the wall surface to all of the amount of fuel supplied to the engine becomes high. Thus, it takes a comparatively long lag time until the air-fuel ratio of air-fuel mixture introduced into the cylinders varies actually owing to a variation in the fuel-supply amount. In contrast to the above, in case of light-gravity fuel of a high volatility, the above-noted adhesion ratio tends to decrease. In this case, the air-fuel ratio of air-fuel mixture introduced into the cylinder tends to vary with a high response to the variation in the fuel-supply amount.

As set forth above, the response lag-time from a time when the fuel-supply amount varies to a time when the state of the air-fuel ratio of air-fuel mixture in the cylinder varies owing to the variation in the fuel-supply amount, varies depending on the volatility (heavy gravity or light gravity) of fuel supplied to the engine. Detection of the fuel property can be achieved by forcibly changing the fuel-supply amount in a stepped manner, and by measuring a time period from a variation of the fuel-supply amount to occurrence of a variation of the air-fuel ratio based on the variation of the fuel-supply amount, as data correlated to the fuel property.

In the apparatus as claimed in claim 2, the fuel-supply means 101 is provided at each of cylinders of the engine, and the fuel-supply amount stepped change means 102 is constructed to forcibly vary only the fuel-supply amount of pre-selected one of the cylinders in a stepped manner, and additionally the fuel property is detected on the basis of variations in the air-fuel-ratio correlative parameter of the air-fuel mixture introduced into the above-mentioned pre-selected one of the cylinders.

In the apparatus defined in claim 2, the forcible stepped change in the fuel-supply amount, which change is used for the purpose of detection of the fuel property, is not made simultaneously at all of the cylinders, but made only at pre-selected one of the cylinders, thereby avoiding the driveability from deteriorating greatly or improving exhaust-emission control characteristics.

In the apparatus as claimed in claim 3, the above-noted air-fuel-ratio correlative parameter detection means 103 is constructed to detect an internal pressure in the engine cylinder as an engine-operation state indicative parameter correlated with the air-fuel ratio of air-fuel mixture introduced into the cylinder.

In the apparatus defined in claim 3, the internal pressure in the engine cylinder is detected as the engine-operation state indicative parameter correlated with the air-fuel ratio of the air-fuel mixture introduced into the cylinder, utilizing variations in the internal pressure (combustion pressure) in the cylinder depending on the air-fuel ratio of the air-fuel mixture introduced into the cylinder.

Furthermore, the apparatus as claimed in claim 4, is constructed so that the fuel-supply amount stepped change means 103 temporarily performs forcible step-up or step-down operations for the fuel-supply amount, while the air-fuel-ratio variation-time measurement means 104 measures a time period from a time when a stepped change in the fuel-supply amount occurs after starting the step-up or step-down operations to a time when a change in the air-fuel ratio based on the stepped change in the supply amount is detected.

In the apparatus as claimed in claim 5, the fuel-supply amount stepped change means 103 is constructed to forcibly step up or step down the fuel-supply amount continuously for a predetermined time interval, while the air-fuel-ratio variation-time measurement means is constructed to measure a time period from a time when the stepped change in the fuel-supply amount occurs owing to termination of the step-up or step-down operations after the above-noted predetermined time interval has elapsed to a time when the change in the air-fuel ratio corresponding to the stepped change in the fuel-supply amount is detected.

In the apparatus defined in claim 5, an elapsed time is measured from a starting point corresponding to a stepped change in the fuel-supply amount occurring when a normal fuel-supply amount has been recovered from the continuously stepped-up or stepped-down fuel-supply amount.

The apparatus as claimed in claim 6, further comprises engine-starting dependent increasing-correction means for increasingly correcting the fuel-supply amount discharged from the fuel-supply means 101 depending on a temperature in the engine, for a predetermined period of time after completion of the engine starting operation. Additionally, the fuel-supply amount stepped change means 102 is so designed to forcibly change the fuel-supply amount in a stepped manner, during increasing correction achieved by the previously-noted engine-starting dependent increasing-correction means.

In the apparatus defined in claim 6, when the engine-starting dependent increasing-correction for the fuel-supply amount is made, that is, when a comparatively great increasing-correction is made in order to stabilize the engine operation just after starting the engine, the fuel-supply amount is changed in a stepped manner, for the purpose of detection of the fuel property. Thus, the above-noted stepped change in the fuel-supply amount results in an early detection of the fuel property, avoiding the driveability from deteriorating.

The apparatus as claimed in claim 7 further comprises temperature condition detection means for detecting a temperature condition of the engine during engine operation, and high-temperature sensitive fuel-property detection inhibit means for inhibiting the fuel-property detection achieved by the fuel-property detection means, when the temperature condition of the engine exceeds a predetermined temperature.

In the apparatus defined in claim 7, the fuel-property detection based on the stepped change in the fuel-supply amount is stopped and inhibited in case of a high-temperature condition of the engine, thereby avoiding erroneous detection of the fuel property under a high-temperature condition in which variations in the fuel volatility cannot be remarkably reflected by the time period measured.

Furthermore, the apparatus as claimed in claim 8 further comprises engine-accessories load-fluctuations sensitive fuel-property detection inhibit means for inhibiting the fuel-property detection achieved by the fuel-property detection means, when load fluctuations in electrical accessories of the engine are detected by way of engine-accessories load-fluctuations detection means, during measurement of the time period executed by the air-fuel-ratio variation-time measurement means 104.

In the apparatus defined in claim 8, in case of occurrence of load fluctuations (disturbance) in engine accessories such as an air conditioner or a power steering in the middle of measurement of an elapsed time which measurement is started from the time when a stepped change in the fuel-supply amount occurs, the fuel-property detection is stopped, thereby avoiding erroneous detection of the fuel property owing to the disturbance.

Moreover, the apparatus according to the present invention further comprises means for correcting an increasing-correction amount added to a reference fuel-supply amount for the purpose of optimization of an air-fuel ratio on the basis of the parameter indicative of the fuel property of fuel supplied to the engine.

BEST MODE FOR CARRYING OUT THE INVENTION

The present invention will be hereinbelow described in detail on the basis of the embodiment shown in the drawings attached hereto.

Figure 2:
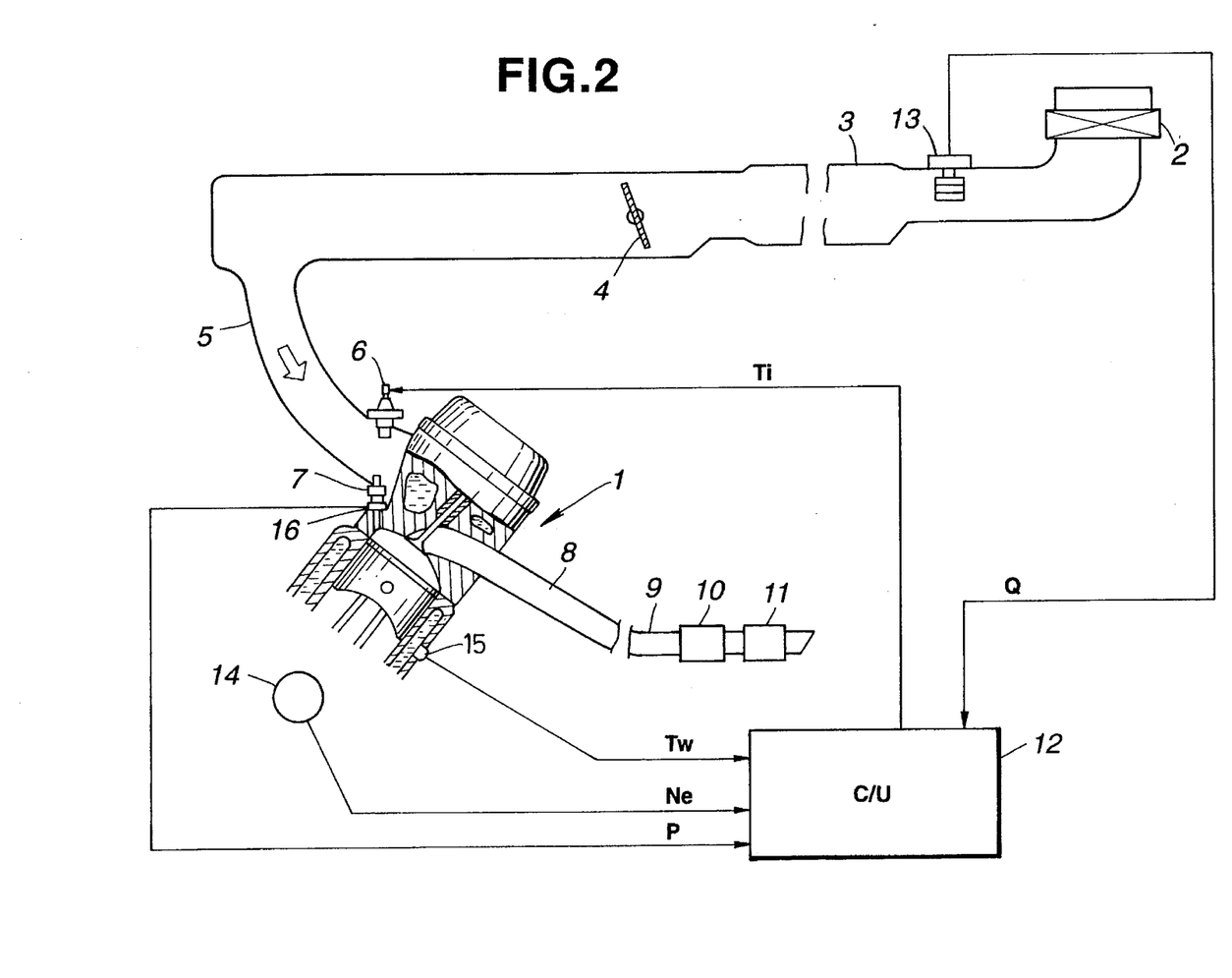
FIG. 2 is a schematic diagram illustrating a construction of one embodiment of the apparatus of the invention.

Referring now to FIG. 2, there is shown a preferred embodiment according to the invention. In FIG. 2, an internal combustion engine 1 is an internal combustion engine for an automotive vehicle which uses as fuel such as gasoline. In the internal combustion engine 1, air is introduced from an air cleaner 2 through an air-intake duct 3, a throttle 4, and an intake manifold 5. Fuel-injection valves 6 are provided at respective branch pipes of the intake manifold 5, for feeding fuel into each engine cylinder by way of fuel-injection.

Each fuel-injection valve 6 is comprised of an electromagnetic fuel-injection valve which is opened when its solenoid is energized and closed when the solenoid is de-energized. The opening and closing action of the valve is controlled in response to a drive pulse signal generated from a control unit 12 as explained later. Introduced into the fuel-injection valve 6 is fuel which is pumped by a fuel pump (not shown) and regulated at a predetermined pressure level by means of a pressure regulator. When the fuel-injection valve 6 is cyclically opened, the fuel is intermittently injected and supplied into the engine 1.

Spark plugs 7 are provided in the respective combustion chambers of the engine 1, for firing and burning air-fuel mixtures in the cylinders by way of spark ignition. Then, exhaust gases are exhausted from the engine 1 through an exhaust manifold 8, an exhaust duct 9, a three-way catalytic converter 10 and a muffler 11.

The control unit 12 which unit is provided for an electronic control for fuel delivery to the engine 1, is constructed as a microcomputer system including a central processing unit (CPU), a read only memory (ROM), a random access memory (RAM), an analog-to-digital converter (A/D converter), and input and output interfaces and the like. The control unit receives input signals from various sensors, and executes a predetermined arithmetic processing as described later, and also controls the operation of the respective fuel-injection valves 6.

Provided as one of the above-noted sensors is an air-flow meter 13 disposed in the air-intake duct 3, for the purpose of producing a signal indicative of a flow rate Q of air introduced into the engine 1.

Also provided is a crank-angle sensor 14 which generates a reference-angle indicative signal REF every reference angular position for example a top dead center generally abbreviated to TDC and additionally generates a unit-angle indicative signal POS every unit angle such as 1° or 2°. With this arrangement, an engine revolution speed Ne can be derived and calculated by measuring a time period of the reference-angle indicative signal REF or the number of occurrence of the unit-angle indicative signals POS for an unit hour.

An engine coolant temperature sensor 15 is provided for detecting a temperature Tw (serving as a parameter representative of a temperature in the engine 1) of coolant in the water jacket of the engine 1.

Also provided at each of cylinders between the respective spark plug and the cylinder head in the form of a washer for the spark plug 7 is a cylinder internal-pressure sensor 16. An internal pressure (a combustion pressure) in each of the cylinders can be detected by way of the associated cylinder internal-pressure sensor 16. The previously-noted cylinder internal-pressure sensor 16 has a piezoelectric-crystal element and electrodes, and interleaved between the spark plug 7 and the cylinder head of the engine 1. This type of the cylinder internal-pressure sensor 16 is well-known by one ordinarily skilled in the art and has been disclosed in Japanese Utility Model First Publication (Jikkai Showa) No. 63-17432.

Instead of the above-noted type of the cylinder internal-pressure sensor 16 which is installed together with the spark plug 7, a different type which can detect an internal pressure in the engine cylinder as an absolute pressure by way of a sensing portion exposing directly to the combustion chamber, may be used.

The control unit 12 receives ON/OFF signals from an air conditioner switch (not shown), a power-steering switch and various electricity-consumer switches (rear defogger switch or the like). These signals indicate a condition of load applied to the respective electrical accessories of the engine. On the basis of the load condition, fluctuations in the load of the accessories can be detected.

The CPU of the microcomputer accommodated in the control unit 12 performs an arithmetic processing in accordance with a program stored in the ROM to derive a fuel-injection amount (an injection pulse-width) Ti for the engine 1 and to output a drive pulse signal of a pulse width corresponding to the fuel-injection amount Ti (a fuel-supply amount) to the fuel-injection valve 6 at a predetermined injection-timing.

The fuel-injection amount Ti is derived from the following expression.

$$Ti = Tp \times Co + Ts$$

where Tp denotes a reference fuel-injection amount, Co denotes a correction factor based on various factors, and Ts denotes a voltage-fluctuation dependent correction factor.

The reference injection-amount Tp is calculated as a function of the flow rate Q of the introduced air and the engine revolution speed Ne, while the voltage-fluctuation dependent correction factor Ts is provided for correction of an increase in a reactive injection-amount created owing to voltage drop of the car battery.

Also, the correction factor Co is derived from an expression $Co=\{1+K_{MR}+K_{TW}+K_{AS}+K_{ACC}+K_{DC}+ \ldots \}$, where $K_{MR}$ denotes an air-fuel-ratio correction factor, $K_{TW}$ denotes an engine-coolant-temperature dependent increasing-correction factor, $K_{AS}$ denotes an engine-starting dependent increasing-correction factor, $K_{ACC}$ denotes an acceleration dependent increasing-correction factor, and $K_{DC}$ denotes a deceleration dependent decreasing-correction factor.

The air-fuel-ratio correction factor $K_{MR}$ is a coefficient necessary to correct the reference injection-amount Tp for the purpose of providing an optimal air-fuel ratio in consideration of both the engine revolution speed Ne and the reference injection-amount Tp (indicating the engine load). The engine-coolant-temperature dependent increasing-correction factor $K_{TW}$ is a coefficient necessary to increasingly correct the fuel-injection amount when the coolant temperature Tw is still low. Additionally, the engine-starting dependent increasing-correction factor $K_{AS}$ is a coefficient necessary to increasingly correct the fuel-injection amount when the coolant temperature Tw is low just after the engine starts. The engine-starting dependent increasing-correction factor is so designed that its increasing-correction amount is gradually reduced in accordance with an elapsed time after the engine starts and finally reaches zero. The acceleration dependent increasing-correction factor $K_{ACC}$ is provided to increasingly correct the fuel-injection amount so as to avoid fluctuations in the air-fuel ratio during acceleration, while the deceleration dependent decreasing-correction factor $K_{DC}$ is provided to decreasingly correct the fuel-injection amount so as to avoid fluctuations in the air-fuel ratio during deceleration.

The correcting requirement for the fuel-injection amount based on the correction factor Co, is dependent on the fuel property, particularly the fuel volatility (heavy-gravity or light-gravity). In comparison with a light-gravity fuel of a high volatility, in case that a heavy-gravity fuel of a low volatility is used, the requirement for increasing-correction based on the coolant-temperature dependent increasing-correction factor $K_{TW}$ and the acceleration dependent increasing-correction factor $K_{ACC}$ amount becomes great.

Thus, there is a possibility of lack of an actual increasing-correction level with respect to the requirement for increasing-correction and of shift to a leaner air-fuel-mixture ratio. To prevent the stability of engine operation from deteriorating owing to the leaner air-fuel-mixture ratio, in the conventional air-fuel ratio control, initial values of the coolant-temperature dependent increasing-correction factor $K_{TW}$ and the acceleration dependent increasing-correction factor $K_{ACC}$ are set to be in conformity with a heavy-gravity fuel in case of which there is the greatest requirement for increasing correction.

In contrast to the above, in case that an actual fuel supplied to the engine is a light-gravity fuel, the increasing-correction amount becomes excessively great owing to the above-mentioned initial values, thereby resulting in deterioration of the exhaust-emission control characteristic, particularly an increase in a concentration of hydrocarbons (HC). To avoid this, in case of the present embodiment, the control unit 12 indirectly detects the fuel volatility as to whether the fuel supplied to the engine is a heavy-gravity or a light-gravity, and properly corrects the coolant-temperature dependent correction factor $K_{TW}$ and the acceleration dependent correction factor $K_{ACC}$ based on the detected fuel property so that these correction factors are in conformity with the property of fuel actually used in the engine, as set out below.

Figure 3:
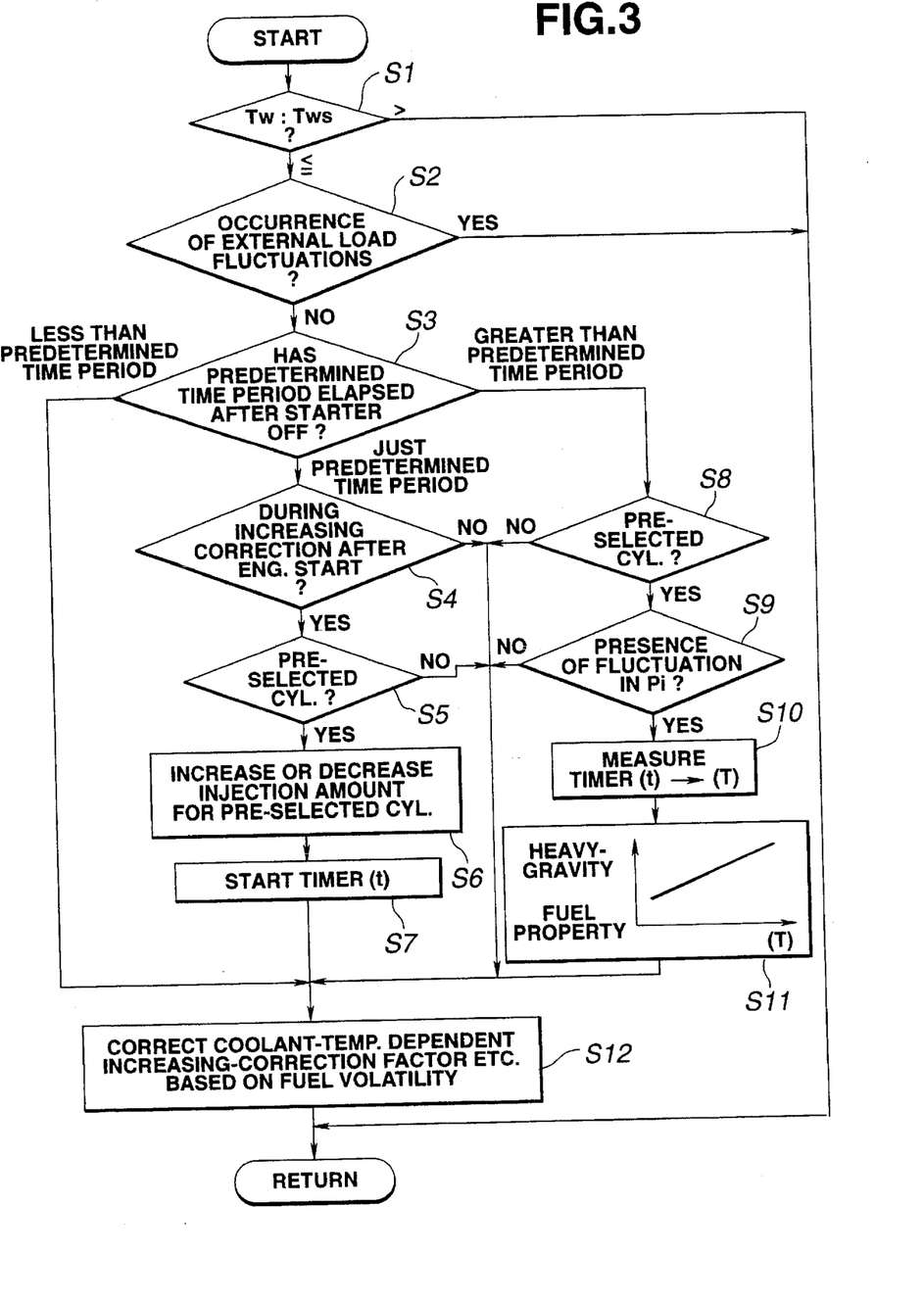
FIG. 3 is a flow chart illustrating a procedure of fuel-property detecting control of a first embodiment.

As seen in the flow chart shown in FIG. 3, by means of the control unit 12, a detection for a property (heavy-gravity or light-gravity) of fuel supplied to the engine is made and a correction of each correction factor is made on the basis of the detection result.

In the shown embodiment, as set out below, variations in an air-fuel ratio of air-fuel mixture actually introduced into the cylinder are detected in the form of variations in the cylinder internal-pressure (combustion pressure). The cylinder internal-pressure is a parameter greatly correlated with an air-fuel ratio of air-fuel mixture actually introduced into the engine cylinder.

As appreciated from the flow chart of FIG. 3, firstly, in step 1 (represented as S1 in the flow chart), a test is made to determine whether the coolant temperature Tw is less than or equal to a predetermined temperature Tws, for the purpose of preventing the fuel property from being detected during engine restarting in a high-temperature state in the engine. This means that there are almost no remarkable variations in the volatility of fuel supplied to the engine during re-starting in the high-temperature state of the engine. Thus, in case that the coolant temperature Tw is above the predetermined temperature Tws, one cycle of the program terminates, to avoid an erroneous detection of the fuel property.

As appreciated, in the shown embodiment, the coolant temperature Tw is used as a temperature condition of the engine 1. In lieu thereof, an ambient temperature, a fuel temperature, or a temperature of the engine body such as a cylinder head or a cylinder block, may be used.

When the coolant temperature Tw is less than or equal to the predetermined temperature Tws, step 2 proceeds in which a test is made to determine whether or not there is occurrence of fluctuations (ON/OFF switching operations) in electrical load (external load) applied to engine accessories, for example various electricity-consuming devices including an air conditioner, a power steering and the like, during measurement of a time period as hereinbelow described.

In the present embodiment, as explained later, the apparatus of the present invention is so designed to detect the fuel property on the basis of a time period from a time when the fuel-supply amount is varied forcibly to a time when fluctuations in an integral Pi of the cylinder internal-pressure occurs owing to the forcible variation in the fuel-supply amount. As can be appreciated, in case of occurrence of the previously-noted engine-accessories load fluctuations serving as a disturbance, a detection accuracy of the fuel property will be deteriorated. Thus, during detection of the fuel property (that is, in the middle of measurement of the time period), in the event that the engine-accessories load fluctuations are detected, one cycle of the program terminates, to avoid an erroneous detection of the fuel property.

When the coolant temperature Tw is less than or equal to the predetermined temperature Tws, and there are no fluctuations in the engine-accessories load, step 3 proceeds.

In step 3, a test is made to determine whether an elapsed time, which is counted from a time when a starter motor or a starter switch (not shown) has been turned OFF, does not yet reach a predetermined time period, or just reaches the predetermined time period, or exceeds the predetermined time period.

It is preferable that the previously-noted predetermined time period is set to a time period from a time when the starter is turned OFF substantially to a time when the engine revolution speed Ne becomes stable.

In the case that the predetermined time period has not elapsed after the starter is turned OFF, the program terminates. At the time when the predetermined time period has been just reached, the procedure flows from step 3 to step 4.

In step 4, a test is made to determine whether or not the increasing-correction based on the engine-starting dependent increasing-correction factor $K_{AS}$ is executed. In other words, a test is made to determine whether or not the engine-starting dependent increasing-correction factor $K_{AS}$ is "0".

Figure 4:
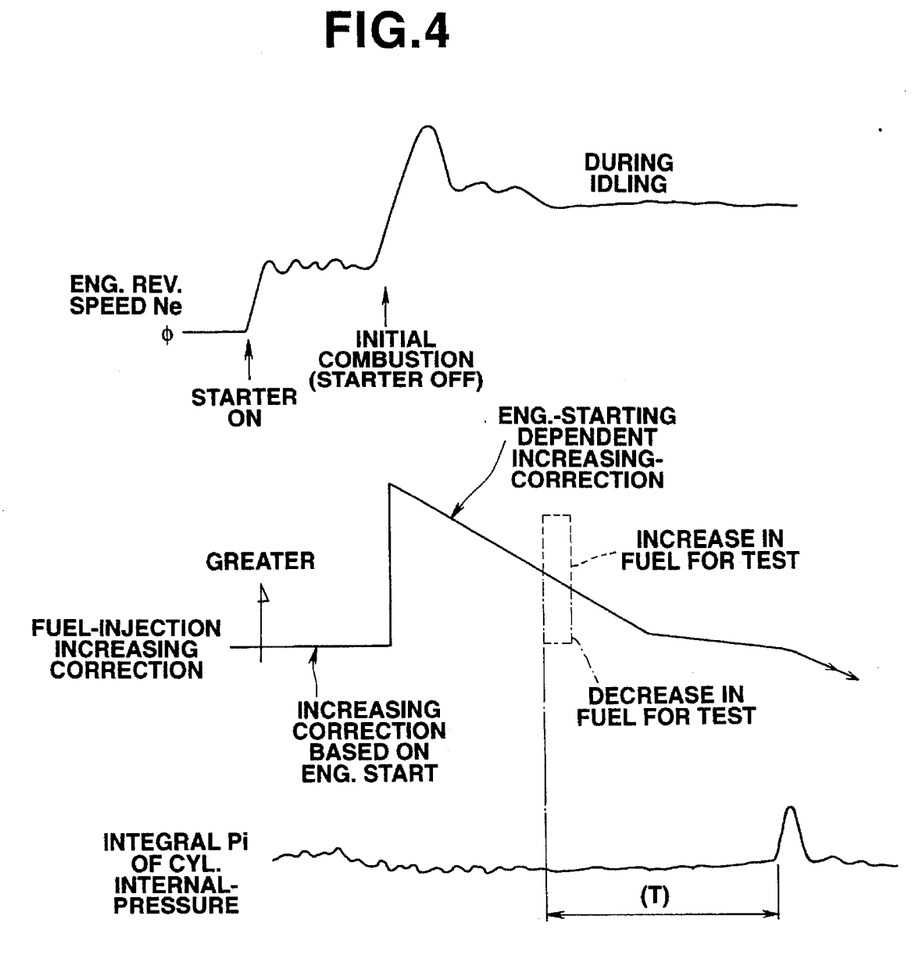
FIG. 4 is a time chart explaining the control procedure executed by the first embodiment.

As previously described, the correction amount or level of the previously-noted increasing-correction based on the engine-starting dependent increasing-correction factor $K_{AS}$ is so designed that its initial level is set depending on the coolant temperature Tw when the starter is turned OFF, and the correction level is gradually reduced in accordance with the elapsed time, and the correction level finally reaches "0" (See FIG. 4). By the aid of the engine-starting dependent increasing-correction factor $K_{AS}$, the fuel-supply amount can be further increased in comparison with the increasing-correction level based on the engine-coolant-temperature dependent increasing-correction factor $K_{TW}$, thereby ensuring a more stable engine operation after completion of the engine-starting operation.

In step 4, when the engine-starting dependent increasing-correction factor $K_{AS}$ is "0", that is, the increasing-correction based on the engine-starting dependent increasing-correction factor $K_{AS}$ is not executed, the program terminates. In contrast, when the engine-starting dependent increasing-correction factor $K_{AS}$ is a value other than "0", that is, during the increasing-correction based on the engine-starting dependent increasing-correction factor $K_{AS}$, step 5 proceeds.

In step 5, a test is made to determine which cylinder is a pre-selected one of the engine cylinders. In this step, in case of the injection timing of the pre-selected engine cylinder, the procedure goes to step 6. In step 6, as indicated by the broken line in FIG. 4, the fuel-injection amount for the pre-selected engine cylinder is forcibly and temporarily increased for a predetermined time interval, for the purpose of detection of the fuel property. Alternatively, as indicated by the one-dotted line, the fuel-injection amount for the pre-selected engine cylinder may be forcibly decreased.

The forcible increase or decrease in the fuel-injection amount may be replaced with arithmetically calculated data for increase or decrease in the fuel-injection amount Ti (injection pulse-width). For example, in case of the increasing operation of the fuel-injection amount, in addition to the injection pulse based on the fuel-injection amount Ti, an additional injection pulse for increasing-correction may be generated. Instead thereof, an injection pressure may be properly adjusted. That is, any methods according to which the fuel-injection amount can be forcibly increased or decreased in a stepped manner, may be used.

As explained later, the temporary increase or decrease in the fuel-injection amount executed in step 6, is forcibly made for the purpose of detecting the fuel property. In the case that the fuel-injection amount is controlled in a direction of increasing-correction, the air-fuel ratio is adjusted toward a richer air-fuel-mixture ratio. Conversely, in the case that the fuel-injection amount is controlled in a direction of decreasing-correction, the air-fuel ratio is adjusted toward a leaner air-fuel-mixture ratio. However, such a forcible adjustment to a richer air-fuel mixture or to a leaner air-fuel mixture is performed at only a pre-selected one of engine cylinders, the effect on the driveability can be suppressed to a minimum.

At the subsequent step 7, at the timing when the temporary increase or decrease in the fuel-injection amount assigned to the pre-selected cylinder begins, that is, at the timing when the fuel-supply amount to be supplied to the air-intake section of the pre-selected cylinder steps up or down, a timer (t) is started.

The present program is repeatedly executed as time-triggered interrupt routines. In step 3, in case that the elapsed time counted from the time when the starter is turned OFF exceeds the predetermined time period, the procedure flows from step 3 to step 8. In step 8, a test is made to determine which cylinder is the pre-selected cylinder being subjected to the above-noted forcible adjustment of the fuel-injection amount. Subsequently, step 9 proceeds in which a test is made to determine whether or not a fluctuation in the integral Pi of the cylinder internal-pressure of the pre-selected cylinder occurs. The integral Pi corresponds to a value obtained by integrating the cylinder internal-pressure P, which pressure is detected by the cylinder integral-pressure sensor 16 provided at the pre-selected cylinder, by an integrated interval including at least the combustion stroke.

In the case of the forcible adjustment of the fuel-injection amount in the direction of increasing-correction, in step 9, a test is made to determine whether the integral Pi increases to such a degree that the integral is above a predetermined upper limit. In contrast to the above, in the case of the forcible adjustment of the fuel-injection amount in the direction of decreasing-correction, in step 9, a test is made to determine whether the integral Pi decreases to such a degree that the integral is below a predetermined lower limit, and additionally to detect a great fluctuation of the integral, i.e., a time point through which the integral becomes greater than the upper limit or less than the lower limit.

In step 9, when the great fluctuation of the integral Pi is detected, step 10 proceeds in which a current time (the elapsed time counted from the beginning of the step-up or step-down adjustment of the fuel-injection amount) measured by the timer (t) is sampled and stored in a memory address [T] as a parameter indicative of the fuel volatility (heavier-gravity or lighter gravity).

As appreciated from the fundamental concept of the present invention, when fuel is supplied from the fuel-injection valve 6 to the air-intake system of the engine, all of fuel cannot be introduced into the cylinder. Some of fuel could be adhered to the inner wall surface of the air-intake passageway or to the intake valves, depending on a volatility of fuel. For example, in case of heavy-gravity fuel of a low volatility, a ratio (adhesion ratio) of the amount of fuel adhered to the wall surface to all of the amount of fuel supplied to the engine becomes high. Thus, it takes a comparatively long lag time until the air-fuel ratio of air-fuel mixture introduced into the cylinders varies actually owing to a stepped change in the fuel-supply amount. In contrast to the above, in case of light-gravity fuel of a high volatility, the above-noted adhesion ratio tends to decrease. In this case, the air-fuel ratio of air-fuel mixture introduced into the cylinder tends to vary with a high response to the variation in the fuel-supply amount.

Therefore, when varying the fuel-supply amount in a stepped manner, a time period from a time of the stepped change in the fuel-supply amount to a time when the air-fuel ratio fluctuation is detected, can be correlated with the volatility of fuel actually supplied, such as a heavy-gravity or a light-gravity. Hereupon, on the basis of the fact that the combustion pressure (the cylinder internal-pressure) varies in accordance with the variation in the air-fuel ratio of air-fuel mixture introduced into the cylinder, the apparatus of the shown embodiment is so designed that the cylinder internal-pressure is detected as an engine-operation state indicative parameter correlated with the air-fuel ratio of the mixture introduced into the cylinder, instead of a direct detection of the air-fuel ratio in the mixture in the cylinder.

In step 10, the response lag-time [T] of the combustion pressure (cylinder internal-pressure) with respect to the stepped change in the fuel-injection amount is sampled, and then step 11 proceeds in which the response lag-time [T] is converted to a parameter indicative of the fuel property. On the basis of the parameter, the degree of the fuel volatility indicative of whether the fuel supplied to the engine is a heavy gravity or a light gravity.

Thereafter, step 12 proceeds in which the initial values (respective values initially set to conform to heavy-gravity fuel) of the coolant-temperature dependent increasing-correction factor $K_{TW}$ and the acceleration dependent increasing-correction factor $K_{ACC}$ are properly corrected on the basis of the parameter indicative of the fuel volatility, in such a manner as to provide the irreducible minimum of increasing-correction necessary for fuel actually supplied to the engine in accordance with the detected fuel property.

As set forth above, in case of the above-noted embodiment, the detection of the fuel property (heavier gravity or lighter gravity) is made by executing a temporary increase or decrease in the fuel-injection amount and additionally by measuring a time period from a time of execution of the forcible change in the fuel-injection amount to a time when the change in the fuel-injection amount is detected as a change in the air-fuel ratio in air-fuel mixture in the cylinder. Therefore, it is possible to quickly determine the fuel property immediately after the engine starts. In this manner, the early detection of the fuel property enables the coolant-temperature dependent increasing-correction factor $K_{TW}$ and the acceleration dependent increasing-correction factor $K_{ACC}$ to be corrected quickly to conform to the incoming fuel actually supplied to the engine. Such quick correction improves exhaust-emission control characteristics.

The above-noted forcible increase or decrease in the fuel-injection amount is executed during the engine-starting dependent increasing-correction in which the air-fuel ratio is shifted greatly to a richer air-fuel-mixture ratio. This avoids a combustion performance of the pre-selected cylinder from being greatly deteriorated, even when the forcible decrease in the fuel-injection amount is executed.

Decision instruction indicating that the predetermined time period had elapsed from the time when the starter is turned OFF, is provided as a necessary condition for the forcible change in the fuel-injection amount, thereby avoiding deterioration in the driveability which deterioration will occur when the fuel-injection amount is forcibly varied in the unstable state of engine operation just after completion of the engine starting operation.

Furthermore, the forcible change in the fuel-injection amount is executed at only the pre-selected cylinder and additionally terminated for a short time period, thereby preventing the exhaust-emission control characteristics from being deteriorated by the increasing correction, even when the fuel-injection amount is adjusted in the direction of increasing-correction for the purpose of detecting the fuel property.

Also, the apparatus of the invention is so designed to measure an elapsed time from a time of production of the stepped change in the fuel-injection amount to a time when a change in combustion pressure, namely, a change in the air-fuel ratio occurs owing to the stepped change in the fuel-injection amount. As appreciated, since the presence or absence of the change in the combustion pressure can be easily detected, the apparatus is not easily influenced by the condition of engine operation. Additionally, it is possible to provide a comparatively stable detection of the fuel property irrespective of disturbances. Particularly, the apparatus of the above-noted embodiment is so designed to determine the air-fuel ratio on the basis of the integral Pi of the cylinder internal-pressure, thereby ensuring precise and easy detection of change in the air-fuel ratio.

The data indicative of the fuel property (heavy gravity or light gravity) detected through step 11, may be erased upon turned-OFF of the ignition switch. In the event that there is no fuel delivery in the engine stopping state, on the assumption that there is no change in the fuel property, the data indicative of the fuel property detected through the previous routine may be continuously used. In this case, the fuel delivery may be detected by detecting opening and closing operations of a cap of the fuel-supply outlet so as to clear the data indicative of the fuel property.

In the above-noted embodiment, measured is a time period from a timing of a leading edge shifting from the normal fuel-injection amount to the forcible increase or decrease in the fuel-injection amount to a timing when a fluctuation in the air-fuel ratio (change in combustion pressure) occurs owing to the forcible change in the fuel-injection amount. However, the stepped change in the fuel-injection amount, produced forcibly, is not limited to the increasing or decreasing shift from the normal fuel-injection amount. In contrast to the above, the apparatus may be designed to measure a time period from a timing of a trailing edge shifting from the forcible increase or decrease in the fuel-injection amount to the normal fuel-injection amount to a time when a fluctuation in the air-fuel ratio occurs in the cylinder owing to the recovery to the normal fuel-injection amount.

Hereinbelow described in detail is the second embodiment in which the fuel property is detected by measuring a time period from the stepped change appearing at a timing returning from the forcibly corrected fuel-injection amount to the normal fuel-injection amount to a tie when a change in the air-fuel ratio of the mixture in the cylinder is detected owing to the stepped change. The second embodiment will be hereinafter explained in accordance with the flow chart shown in FIG. 5.

In the second embodiment, the cylinder internal-pressure, which is detected by the cylinder internal-pressure sensor 16 is used as a parameter correlated with an air-fuel ratio of the mixture in the cylinder.

Figure 5:
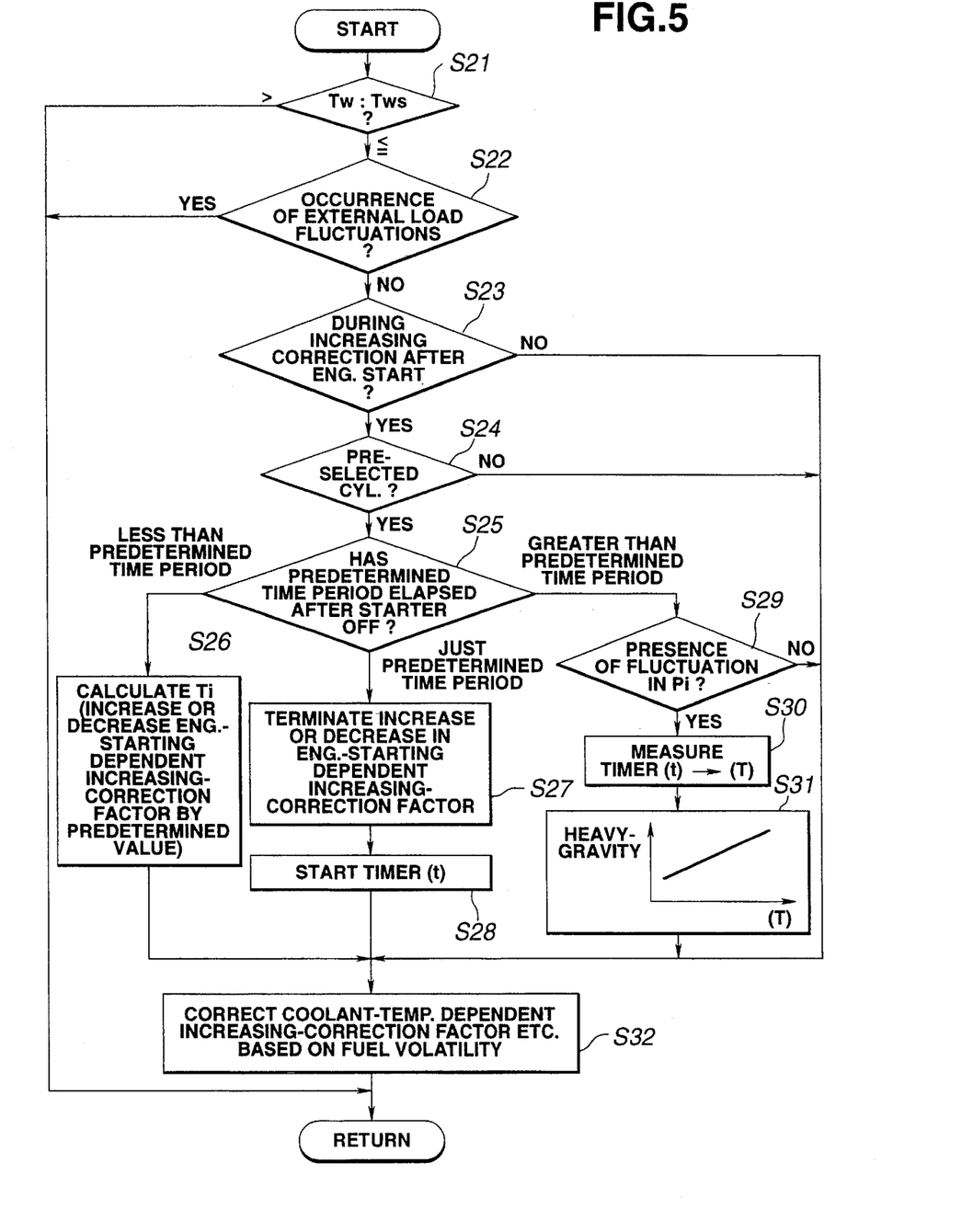
FIG. 5 is a flow chart illustrating a procedure of fuel-property detecting control of a second embodiment.

Referring now to the flow chart shown in FIG. 5, firstly, in steps 21 and 22, in the same manner as the first embodiment shown in the flow chart of FIG. 3, a test is made to determine whether or not the coolant temperature Tw is less than or equal to the predetermined temperature Tws, and additionally a test is made to determine whether there is occurrence of fluctuations in electrical load (external load) to engine accessories, for example various electricity-consumers including an air conditioner, a power steering and the like, in the middle of measurement of the elapsed time measured until the fluctuation in the integral Pi of the cylinder internal-pressure is detected.

Subsequently, in step 23, a test is made to determine whether or not the increasing-correction based on the engine-starting dependent increasing-correction factor $K_{AS}$ is executed. During the increasing correction after completion of the engine start, the procedure goes to step 24.

In step 24, a test is made to determine which cylinder is a pre-selected cylinder assigned to a forcible change in the fuel-injection amount for the purpose of the fuel-property test. In this step, in case of the injection timing of the pre-selected engine cylinder, the procedure goes to step 25.

In step 25, a test is made to determine whether an elapsed time, which is counted from a time when a starter has been turned OFF, does not yet reach a predetermined time period, or just reaches the predetermined time period, or exceeds the predetermined time period.

When the elapsed time counted from the time when the starter is turned OFF is less than the predetermined time period, the procedure flows to step 26 in which the engine-starting dependent increasing-correction factor $K_{AS}$ is increased or decreased by a predetermined change rate or a predetermined value, and then the fuel-injection amount Ti assigned to the pre-selected cylinder is calculated from the increased or decreased engine-starting dependent increasing-correction factor $K_{AS}$. On the basis of the calculated fuel-injection amount Ti, the fuel-injection valve 6 provided at the pre-selected cylinder is driven. As a result, as shown in the broken lines in FIGS. 6 and 7, the fuel-injection amount of the pre-selected cylinder can be forcibly increased or decreased.

Thereafter, in the case that the decision instruction of step 25 indicates that the elapsed time counted from the turned OFF of the starter reaches the predetermined time period, step 27 enters in which the increase or decrease in the engine-starting dependent increasing-correction factor $K_{AS}$ is terminated.

That is to say, until the elapsed time reaches the predetermined time period after the starter is turned OFF, the engine-starting dependent increasing-correction factor $K_{AS}$ used for calculation of the fuel-injection amount of the pre-selected cylinder is continuously increased or decreased by the predetermined change rate or the predetermined value with the result that only the pre-selected cylinder is maintained at the fuel-injection amount different from that of the other cylinders. Thereafter, at the time point when the predetermined time period had been elapsed, the increase or decrease in the engine-starting dependent increasing-correction factor $K_{AS}$ is terminated, and then the fuel-injection amount of the pre-selected cylinder is recovered to the same normal fuel-injection amount as the other cylinders.

Assuming that the predetermined time period, in which the engine-starting dependent increasing-correction factor $K_{AS}$ is forcibly and continuously increased or decreased, is considerably short, the engine-starting dependent increasing-correction factor $K_{AS}$ will be recovered to the normal value before the air-fuel-ratio state based on the forcible change in fuel-injection amount stabilizes. In this case, the change in air-fuel ratio (the change in combustion pressure), based on the recovery of the fuel-injection amount to the normal value, cannot be accurately detected. Therefore, it is preferable to set the predetermined time period provided for the increase or decrease in the engine-starting dependent increasing-correction factor $K_{AS}$ to at least a time period through which the air-fuel-ratio state will stabilize.

After, in step 27, the fuel-injection amount of the preselected cylinder has been changed from the forcibly increased or decreased level to the normal level (the fuel-injection level of the other cylinders) in a stepped manner by way of termination of the increase or decrease in the engine-starting dependent increasing-correction factor $K_{AS}$, step 28 proceeds in which the timer (t) is started for the purpose of measurement of an elapsed time from the stepped change to the normal fuel-injection amount to a time when a change in the air-fuel ratio of the mixture in the cylinder (a change in combustion pressure) is detected.

Then, in step 25, when the elapsed time counted from the turned-OFF operation of the starter exceeds the predetermined time period, the procedure flows from step 25 to step 29 in which a test is made to determine whether or not a fluctuation in the integral Pi of the cylinder internal-pressure of the pre-selected cylinder occurs in response to the stepped change to the normal fuel-injection amount, which change is executed at the time when the predetermined time period has been elapsed.

Figure 6:
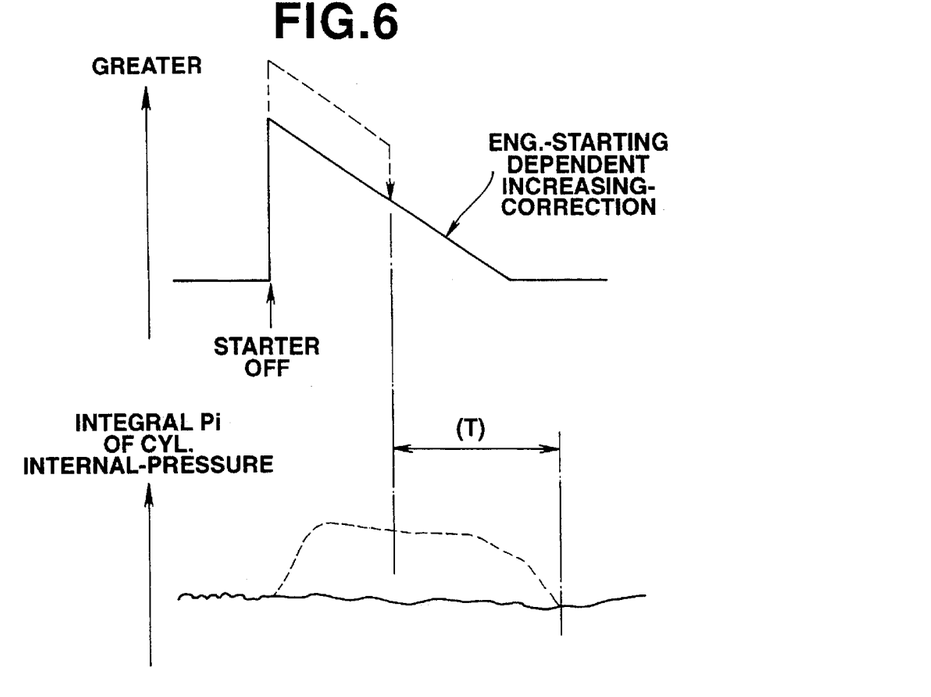
FIGS. 6 and 7 are time charts explaining the control procedure executed by the second embodiment.
Figure 7:
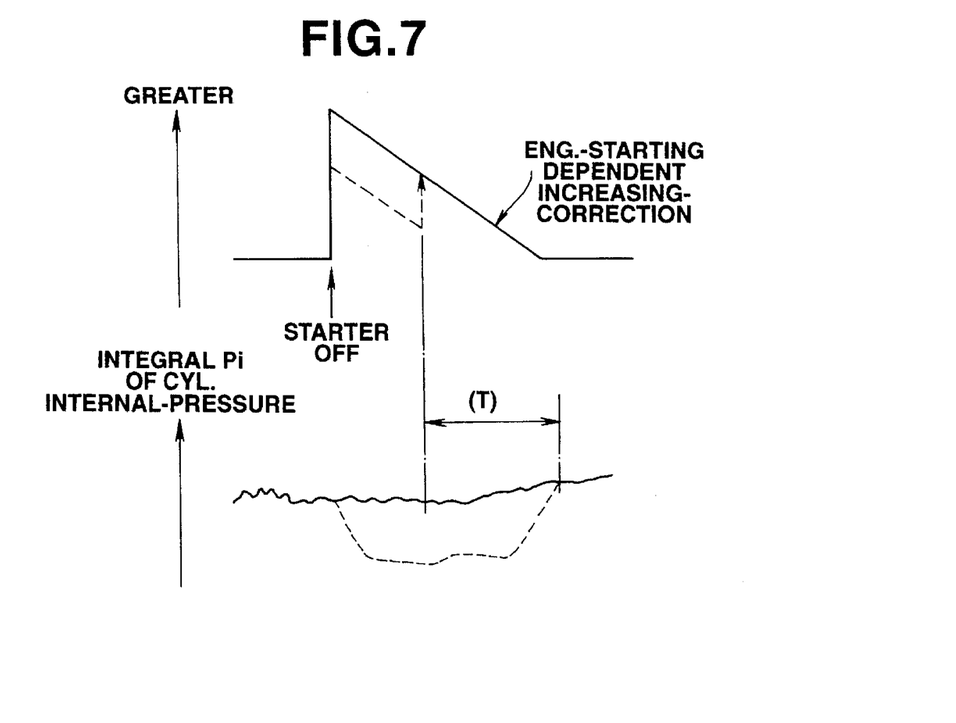

In the case that the engine-starting dependent increasing-correction factor $K_{AS}$ is varied in its increasing direction in step 26, the fluctuation in the integral Pi to be detected in step 29 varies in a direction of decrease in fluctuation (See FIG. 6). Conversely, in the case that the engine-starting dependent increasing-correction factor $K_{AS}$ is varied in its decreasing direction in step 26, the fluctuation in the integral Pi to be detected in step 29 varies in a direction of increase in fluctuation (See FIG. 7).

In the presence of the fluctuation in the integral Pi of the cylinder internal-pressure in step 29, step 30 proceeds in which the counted time of the timer (t) which is started when the normal fuel-injection amount has been recovered (that is, when the fuel-injection amount has been varied in a stepped manner), is sampled and stored in a memory address [T] as an elapsed time from the beginning of the stepped change to the time when the fluctuation in the air-fuel ratio based on the stepped change is detected.

In the next step 31, a parameter indicative of whether the fuel is a heavy gravity or a light gravity, is set on the basis of the measured time [T]. In step 32, the initial values of the coolant-temperature dependent increasing-correction factor $K_{TW}$ and the acceleration dependent increasing-correction factor $K_{ACC}$ are properly corrected on the basis of the parameter indicative of the fuel volatility (heavier gravity or lighter gravity).

Although the apparatus of the respective embodiments is constructed to detect a cylinder internal-pressure as an engine-operation state indicative parameter correlated with an air-fuel ratio of mixture actually introduced into the engine cylinder, the apparatus may be constructed to directly detect an air-fuel ratio of mixture in the cylinder. This type of apparatus for direct detection for an air-fuel ratio has been disclosed in Japanese Patent Provisional Publication (Tokkai Heisei) No. 3-96640 and Japanese Patent Provisional Publication (Tokkai Heisei) No. 1-247740, and well-known by one ordinarily skilled in the art.

Alternatively, for the purpose of detecting a change in an air-fuel ratio of mixture in the cylinder, an oxygen-concentration sensor detecting a concentration of oxygen in exhaust gases, greatly correlated to an air-fuel ratio, can be provided.

As explained above, since the apparatus made according to the present invention, is constructed in such a manner as to forcibly vary the fuel-supply amount in a stepped manner, and to measure a time period from the stepped change in the fuel-supply amount to a time when the change in the air-fuel ratio occurs in response to the stepped change, and to detect the fuel property (heavy-gravity or light-gravity) on the basis of the measured time period, the fuel property can be detected immediately just after the engine starts. Additionally, the apparatus of the invention has the effect of a stable detection of the fuel property, regardless of conditions of engine operation, or disturbances.

Furthermore, the previously-described forcible stepped change in the fuel-supply amount can be made at only a pre-selected one of cylinders, thereby avoiding the change in the fuel-supply amount executed for the purpose of detection of the fuel property from having a great influence on the driveability of the engine.

Moreover, since the change in the air-fuel ratio, based on the stepped change in the fuel-supply amount, is detected as a change in the cylinder internal-pressure, the change in the air-fuel ratio can be detected clearly and easily.

Industrial Applicability

As set forth above, the fuel-property detecting apparatus made according to the present invention is useful for the purpose of accurately executing a control based on a fuel volatility in an air-fuel-ratio control system for an internal combustion engine. Also, the apparatus of the invention is useful for an exhaust emission control system for an internal combustion engine.

We claim:

1. A fuel-property detecting apparatus for an internal combustion engine comprising:

fuel-supply means for supplying fuel into an intake system of an engine;

fuel-supply amount stepped change means for forcibly changing a fuel-supply amount generated from said fuel-supply means in a stepped manner;

air-fuel-ratio correlative parameter detection means for detecting an engine-operation state indicative parameter correlated with an air-fuel ratio of air-fuel mixture introduced into a cylinder of the engine;

air-fuel-ratio variation-time measurement means for measuring a time period from a time when a stepped change in said fuel-supply amount generated from said fuel-supply means occurs to a time when a change in said air-fuel ratio of air-fuel mixture introduced into said cylinder, based on said stepped change, is detected by said air-fuel-ratio correlative parameter detection means; and fuel-property detection means for setting a parameter indicative of a fuel property on the basis of said time period measured by said air-fuel-ratio variation-time measurement means.

2. A fuel-property detecting apparatus for an internal combustion engine, as set forth in claim 1, wherein said fuel-supply means is provided at each of cylinders of the engine, and said fuel-supply amount stepped change means forcibly changes a fuel-supply amount only to a pre-selected one of the cylinders in a stepped manner, and the fuel property is detected on the basis of a change in said engine-operation state indicative parameter correlated with said air-fuel ratio of air-fuel mixture introduced into said pre-selected cylinder.

3. A fuel-property detecting apparatus for an internal combustion engine, as set forth in claim 1, wherein said air-fuel-ratio correlative parameter detection means detects a cylinder internal-pressure of the engine as said engine-operation state indicative parameter correlated with said air-fuel ratio of air-fuel mixture introduced into the cylinder.

4. A fuel-property detecting apparatus for an internal combustion engine, as set forth in claim 1, wherein said fuel-supply amount stepped change means temporarily executes a forcible increase or decrease in said fuel-supply amount, and said air-fuel-ratio variation-time measurement means measures a time period from a time when a stepped change in said fuel-supply amount, occurring after starting said forcible increase or decrease, to a time when a change in an air-fuel ratio, based on said stepped change is detected.

5. A fuel-property detecting apparatus for an internal combustion engine, as set forth in claim 1, wherein said fuel-supply amount stepped change means forcibly increases or decreases said fuel-supply amount continuously for a predetermined time interval, and said air-fuel-ratio variation-time measurement means measures a time period from a stepped change in said fuel-supply amount, based on termination of a forcible increase or decrease in said fuel-supply amount after said predetermined time interval has elapsed, to a time when a change in said air-fuel ratio, based on said stepped change is detected.

6. A fuel-property detecting apparatus for an internal combustion engine, as set forth in claim 1, which further comprises engine-starting dependent increasing-correction means responsive to a temperature of the engine for increasingly correcting said fuel-supply amount generated from said fuel-supply means for a predetermined time period from a time after completion of starting operation of the engine, and said fuel-supply amount stepped change means forcibly changes said fuel-supply amount in a stepped manner during increasing-correction executed by said engine-starting dependent increasing-correction means.

7. A fuel-property detecting apparatus for an internal combustion engine, as set forth in claim 1, which further comprises temperature condition detection means for detecting a temperature condition of the engine during engine operation, and high-temperature sensitive fuel-property detection inhibit means for inhibiting fuel-property detection achieved by said fuel-property detection means when said temperature condition detected by said temperature condition detection means exceeds a predetermined temperature.

8. A fuel-property detecting apparatus for an internal combustion engine, as set forth in claim 1, which further comprises engine-accessories load-fluctuations detection means for detecting load fluctuations in engine accessories, and engine-accessories load-fluctuations sensitive fuel-property detection inhibit means for inhibiting the fuel-property detection achieved by said fuel-property detection means, when load fluctuations in electrical accessories of the engine are detected by said engine-accessories load-fluctuations detection means, during measurement of said period time executed by said air-fuel-ratio variation-time measurement means.

9. A fuel-property detecting apparatus for an internal combustion engine, as set forth in claim 1, which further comprises means for correcting an increasing-correction amount added to a reference fuel-supply amount to optimize an air-fuel ratio on the basis of said parameter indicative of said fuel property of fuel supplied to the engine.

10. A fuel-property detecting method for an internal combustion engine, comprising the steps of:

forcibly changing a fuel-supply amount supplied into an intake system of an engine in a stepped manner;

directly or indirectly detecting an actual change in an air-fuel ratio of air-fuel mixture introduced into a cylinder, occurring due to said change in said fuel-supply amount;

measuring an elapsed time from a time of said forcible change in said fuel-supply amount to a time of detection of said actual change of said air-fuel ratio; and setting a parameter indicative of a fuel property on the basis of said elapsed time.

11. A fuel-property detecting method for an internal combustion engine, as set forth in claim 10, wherein only a fuel-supply amount delivered to a pre-selected cylinder is forcibly changed in a stepped manner, the change in said air-fuel ratio for said pre-selected cylinder is detected.

12. A fuel-property detecting method for an internal combustion engine, as set forth in claim 10, wherein a detection of the change in said air-fuel ratio is made by detecting a cylinder internal-pressure of the engine.

* * * * *